US006556217B1

(12) United States Patent
Mäkipää et al.

(10) Patent No.: US 6,556,217 B1
(45) Date of Patent: Apr. 29, 2003

(54) SYSTEM AND METHOD FOR CONTENT ADAPTATION AND PAGINATION BASED ON TERMINAL CAPABILITIES

(75) Inventors: Mikko Mäkipää, Helsinki (FI); Hemant Madan, Espoo (FI); Oleg Beletski, Helsinki (FI); Erkki Tanskanen, Vantaa (FI); Caj Södergård, Espoo (FI); Matti Aaltonen, Kangasala (FI); Timo Järvinen, Espoo (FI); Timo Kinnunen, Espoo (FI); Antti Tammela, Lempäälä (FI); Antti Väätänen, Tampere (FI); Akseli Anttila, Helsinki (FI); Tapio Hämeen-Anttila, Helsinki (FI); Juuso Vuorenoja, Helsinki (FI); Toni Kopra, Espoo (FI)

(73) Assignee: Nokia Corporation, Tampere (FI)

( * ) Notice: Subject to any disclaimer, the term of this patent is extended or adjusted under 35 U.S.C. 154(b) by 364 days.

(21) Appl. No.: 09/584,499

(22) Filed: Jun. 1, 2000

(51) Int. Cl.[7] .................................................. G09G 5/00
(52) U.S. Cl. ........................ 345/667; 345/670; 345/788
(58) Field of Search ................................. 345/660, 667, 345/668, 669, 670, 788

(56) References Cited

U.S. PATENT DOCUMENTS 6,169,547 B1 * 1/2001 Tanaka et al. ............... 345/667
6,400,375 B1 * 6/2002 Okudaira .................... 345/668

FOREIGN PATENT DOCUMENTS

EP 0917071 A2 5/1999
GB 2339374 1/2000

OTHER PUBLICATIONS

Caj, Södergård et al., "Integrated Multimedia Publishing: Combining TV and Newspaper Content On Personal Channels", The Eighth International World Wide Web Conference, pp. 33–50, May 11–14, 1999.

Bickmore T et al.: "Web Page Filtering and Re–Authoring for Mobile Users" Computer Journal, vol. 42, No. 6, 1999, pp.534–546.

Ham K et al.: "Wireless–adaptation of WWW Content Over CDMA" IEEE International Workshop on Mobile Multimedia Communications (MOMUC '99), San Diego, CA, US, 15–17 November 1999, pp.368–372.

Hori M et al.: "Annotation–Based Web content transcoding" Computer Networks, vol. 33, No. 1–6, June (2000–06), pp.197–211.

* cited by examiner

Primary Examiner—Matthew Luu
(74) Attorney, Agent, or Firm—Antonelli, Terry, Stout & Kraus, LLP

(57) ABSTRACT

A system, method and computer program for paginating information received from a content provider so that it may be displayed on any type of user terminal having any size screen and having different types of mechanisms for input of information. This system has a pagination and terminal adaptation module which will calculate the space needed by element to be displayed on a user terminal. The pagination and terminal adaptation module will then determine if sufficient space exits on the user terminal screen to display the element. When sufficient space does not exist on the user terminal screen then the pagination and terminal adaptation module will resize the element when possible in order to make it fit. The pagination and terminal adaptation module accesses a database of user terminal profile information to determine the characteristics of the user terminal as well as the screen size. This system further is able to transmit information in a continuous stream to the user terminal or as a single element that will only update a portion of the user terminal screen. Using this system a user is able to access web site pages regardless of the type of terminal being used and no matter how small the screen size is.

29 Claims, 8 Drawing Sheets

FIG. 6

| DEVICE TYPE | FUNCTIONS | | |
|---|---|---|---|
| A | B | C | D |
| REQUIRED NAVIGATION FUNCTIONALITY (500) | | | |
| | | PREVIOUS PAGE | |
| | PREVIOUS LEVEL | | NEXT LEVEL |
| | | NEXT PAGE | |
| | | HOME | SEARCH |
| MAPPING IN PC BROWSER ENVIRONMENTS (KEYBOARD NAVIGATION) (510) | | | |
| | | UP KEY | |
| | LEFT KEY | | RIGHT KEY |
| | | DOWN KEY | |
| | | F1 | F3 |
| MAPPING IN PC BROWSER ENVIRONMENTS (MOUSE BASED NAVIGATION) (520) | | | |
| | | PREV PAGE LINK | |
| | BACK LINK | | LINK CLICK |
| | | NEXT PAGE LINK | |
| | | HOME LINK | SEARCH LINK |
| MAPPING IN PDA BROWSER ENVIRONMENTS (KEYBOARD ONLY PDAs) (530) | | | |
| | | UP KEY | |
| | LEFT KEY | | RIGHT KEY |
| | | DOWN KEY | |
| | | CRTL LEFT KEY | CRTL UP KEY |
| MAPPING IN PDA ENVIRONMENTS (POINTER DEVICE/TOUCH SCREEN/ MOUSE, ETC.) (540) | | | |
| | | PREV PAGE LINK | |
| | BACK LINK | | LINK CLICK |
| | | NEXT PAGE LINK | |
| | | HOME LINK | SEARCH LINK |

FIG.9

WMA

Nokia first to Market with Corporate WAP Server

Nokia first to Market with Corporate WAP Server
Wireless Application Protocol (WAP) Server
to ship globally in commercial volumes in
December.

Nokia today announced December 15th availability
of the Nokia WAP Server 1.0, a product which
allows business to securely leverage the Internet
in mobile environments and empower employees on the move. Today's announcement
follows the conclusion of a successful beta
campaign in which thousands of companies and
software developers participated.

To meet the ongoing needs of the developer,
community, Nokia is also offering a complimentary
trial version of the Nokia WAP Server 1.0 product

1(8)

WMA and a new version of the Nokia WAP Toolkit on the
Internet in December.

The Nokia WAP Server, the world's most widely-
used WAP-server software product, allows
businesses to fully leverage the power and
functionality of the Internet in a mobile environment.
It is an open server platform for mobile applications
that lets companies maintain control over end-to-
end security of access to

A WAP phone is the perfect
companion for outdoor use

2(8)

data and customer traffic between the wireless
network and the Internet or their own internal
networks. The Nokia WAP Server complies with
the WAP 1.1 specification and sets an industry
milestone with its security option, the first
commercially available implementation of the
Wireless Transportation Layer Security (WTLS)

Nokia 7110-The
world's first
WAP phone

3(8)

SYSTEM AND METHOD FOR CONTENT ADAPTATION AND PAGINATION BASED ON TERMINAL CAPABILITIES

FIELD OF THE INVENTION

The invention relates to a system and method for the delivery of digital data to a display device. More particularly, the invention is a system and method in which digital data may be transmitted to a user terminal and formatted on a real-time basis so that it may be properly displayed regardless of the size, screen type, processor or browser employed.

BACKGROUND OF THE INVENTION

With the explosion in Internet access and usage individuals have discovered that they may now receive a large amount of information in their homes and offices almost immediately from any number of sources. These sources include everything from the latest news, weather, and sports to stocks, bond and commodity prices. Further, goods and services may be purchased through an enormous number of Internet based web sites. Currently, a typical Internet user would have a browser installed in his local computer or server such as Internet Explorer™ or Netscape™. Using this browser, the user would access an Internet service provider, such as America-On-Line (AOL™), via a modem over the local public switched telephone network (PSTN). Once logged onto the Internet server, the user may utilize one of the many search engines, such as Yahoo™ or Lycos™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale or receive the information desired. Further, if the user discovers a web site he prefers, the user may store the universal resource locator (URL) in a favorites' directory for later quick access. Finally, due partly to the availability of the Internet, day trading has become very popular. Day traders will often sit in front of a monitor and watch as trades in stocks, bonds, currencies, commodities and options occur on the major markets. These day traders will often make numerous purchases and sales in a given day. However, the ability to monitor the trading on a major market such as the New York Stock Exchange (NYSE) is often difficult for the average user since it entails monitoring trading occurring in hundreds of stocks simultaneously. The volume of information that would have to be received would easily exceed the capability of a 56K modem. Further, most web sites on the Internet format their web pages under the assumption that the user terminal screen is of a certain minimum size, such as a twelve to fifteen diagonal inches or larger.

However, most recently Internet user's have been accessing Internet web sites using lap-top computers, personal digital assistants (PDA), and palm computers having an internal or an external modem connected to the local PSTN or via a cellular telephone. These lap-top, PDA and palm computers have screen sizes significantly smaller than those found on the typical personal computer and the Internet web site must create a significantly different web page to accommodate these smaller screen sizes. Further, cellular telephones have been developed with Hyper Text Markup Language (HTML) and Wireless Access Protocol (WAP) capability which allows the user to directly access the Internet without the need for a processor based system such as a lap top, PDA or palm computer. However, the screen size of a WAP or HTML capable phone is even further limited, and is often unable to access a typical Internet web site and is often only used to access a user's e-mail. In order for the typical WAP or HTML capable phone to access a web page the web server must generate a screen specifically for that WAP or HTML cellular phone screen size and type. Thus, the tremendous volume of information that is present on the Internet is often not available to the owner's of a WAP or HTML capable cellular telephone or other devices which have relatively small screen sizes. Further, not only does the size and resolution of the screen vary from one device to another, but also the video capability of the device. In some cases only a simple black and white display is used while in others full 16-bit color is available. Still further, even when using a typical personal computer (PC), many applications found over the Internet are limited to interfacing to specific browsers or versions of a browser such as Internet Explorer™ 5.0. Therefore, these browser specific applications would not interface well with other browsers and not interface at all with a typical mobile communications device such as a WAP capable telephone.

A solution has been proposed by Caj Södergård et al. in a conference paper presented at The Eighth International World Wide Web Conference, held in Toronto, Canada between May 11–14, 1999 entitled "Integrated multimedia publishing: combining TV and newspaper content on personal channels", herein incorporated by reference in its entirety. In this paper an Integrated publishing in Multimedia Network (IMU) was presented which would download a portion of Java script to the browser window to determine the window size in pixels. Thereafter, applets are created at the correct size for the screen employed by the user and would be transmitted to the user.

However, in addition to the problems created by the varying size of the screen and display capability being used and the different browsers being employed by users, it should be noted that the input or response mechanism is radically different in a PC versus a palm computer versus a WAP or HTML capable telephone. In the case of a PC, both a keyboard and a mouse are typically available. However, a palm computer or PDA usually only has a pen that may be used for input. In the case of a WAP capable telephone only a keypad and perhaps arrow keys are supplied due to the limited space. Thus, for a web site to be able to attract all potential customers it would need to adapt to screens of different sizes, resolutions, browsers and input methods. No known hardware or software allows for a web site to provide this capability.

Further, in addition to user devices screens of different sizes and resolutions, these screens vary in their video capabilities and color resolution, or lack thereof. Again, in order for a web site to attract the largest number of potential users it must also deal with user devices that may not have video capability and color as well as those that do. Again, no known hardware or software allows a web site to handle such a wide variation in screens and input mechanisms.

Therefore, what is needed are a system and method in which a web site or some other intermediate server may identify the size and type of screen the web page will be displayed on and adjust or paginate the web page so that the web site may still be accessed and viewed regardless of the device being used. Further, this pagination system and method, when using an intermediate server, should be able to operate with almost any web site so that the operator of the web site would not need to generate and maintain different web pages for different devices and screen types a user may have. In addition to being terminal independent, this system and method should be browser independent so that the user may use any browser available on the market. Still further, this pagination system and method must be able to operate in such a fashion that no or little information is lost or sacrificed when the information is viewed on a relatively small screen size. Finally, this method and system should further be able to adapt to the differing input devices to allow for maximum utilization of the terminal the user has.

SUMMARY OF THE INVENTION

An embodiment of the present invention provides for a method of information pagination in order to display the information on a user terminal screen. This method identifies a user terminal type and screen size upon logon of a user terminal. It then extracts layout rules and typographical settings from a database based on the user terminal type. Thereafter, the method calculates the space required to display an element of a plurality of elements of a page of information on the user terminal screen. It then determines if the space required to display the element is available on the user terminal screen. Resizing of the element is done when the determination is made that there is not adequate space on the user terminal screen to display the element. The element is then displayed, according to the layout rules and typographical settings, on the user terminal screen.

Further, an embodiment of the present invention creates a system and computer program for information pagination in order to display information on a user terminal screen. This system and computer program has a database to store information to display on the user terminal screen and to store a terminal profile for a plurality of user terminals. The system and computer program also has a client connection handler to communicate to a user terminal and retrieve information from the database and transmit the information to the user terminal for display on the user terminal screen. Further, the system and computer program also has a pagination engine to determine, based on the terminal profile, if each element contained in the information retrieved from the database will fit in available space on the user terminal screen. The pagination engine then resizes the element so that the element will fit into the space available on the user terminal screen when it is determined that the element will not fit in the space available on the user terminal screen.

These and other features of this device, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein:

FIG. 6 is an example table illustrating the functions enabled for any given device type which the embodiments of the present invention may interface with;

FIG. 9 is an example of web pages generated using the embodiments of the present invention.

DETAILED DESCRIPTION

Figure 1:
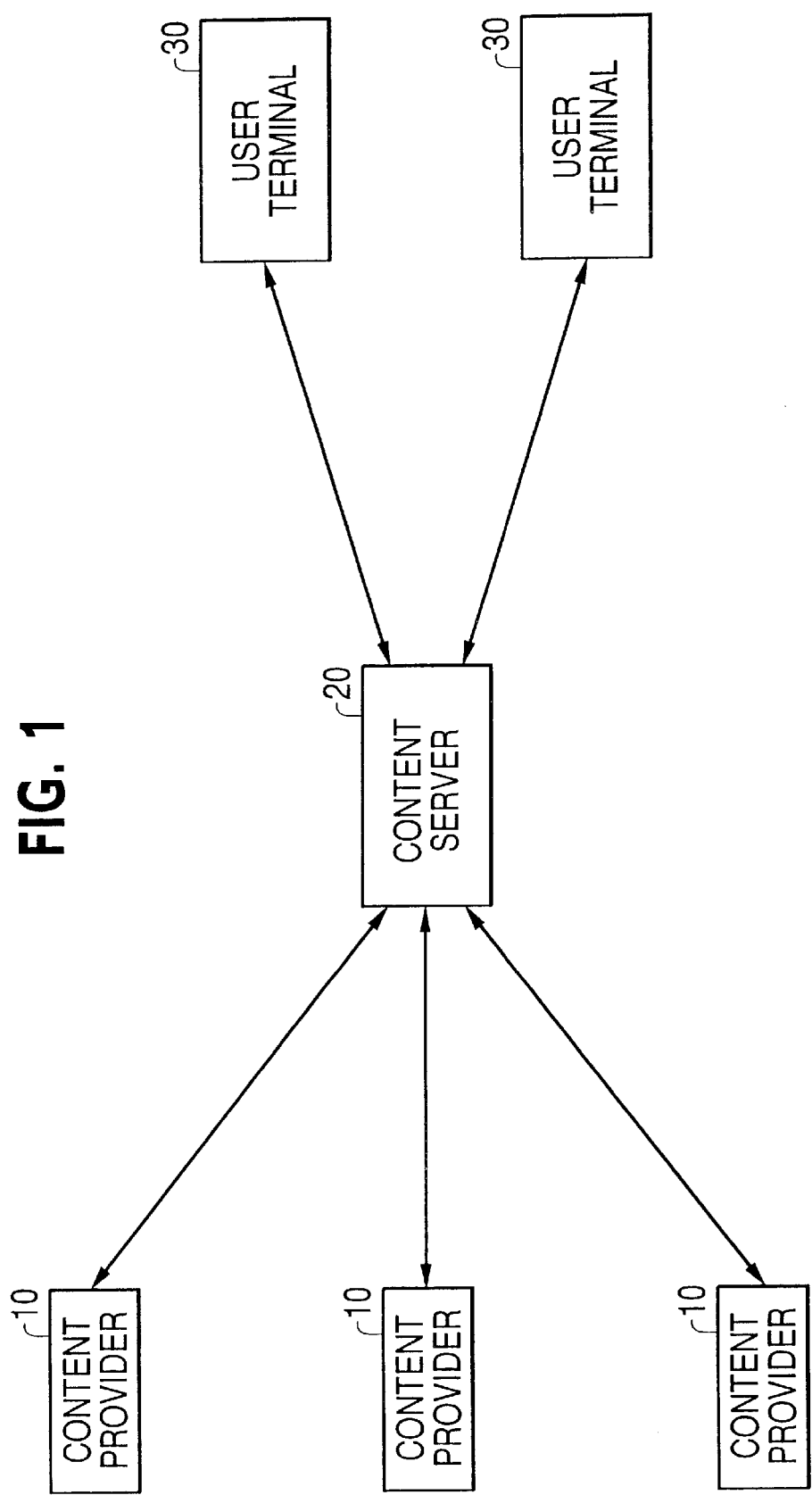
FIG. 1 is an example of an overall system diagram of an embodiment of the present invention.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 is an example of an overall system diagram of an embodiment of the present invention showing the three major components. A user terminal 30 is employed to interface between the user and a content server 20. This user terminal 30 may be, but not limited to, a WAP-capable cellular telephone, a HTML-capable cellular telephone, or a processor-based system connected to a cellular telephone. This processor-based system may be, but not limited to, a palm computer, lap-top computer or personal computer. Further, the user terminal 30 is not limited to the use of a cellular phone and may also use the public switched telephone network (PSTN), a satellite telephone or any form of communications lines such as standard twisted pair phone lines, coax cable and fiber optics. These communications lines may be leased lines including: T1 lines capable of transmitting at 1.54 Mbits/sec; T3 lines capable of transmitting at 45 Mbits/sec; E1 lines capable of transmitting at 2.048 Mbits/sec; and E3 lines capable of transmitting at 34 Mbits/sec.

Still referring to FIG. 1, the user terminal 30 communicates to the content server 20 which is responsible for delivering data information to the user terminal 30 from a content provider 10. The content provider 10 may be any supplier of real-time information as exemplified by, but not limited to, a stock exchange, commodities market, brokerage firm, currency exchange, news wire service, gaming service, and sport event reporting service. Further, the content provider 10 may be any type of Internet web site such as, but not limited to, a merchandise vendor. The content provider 10 and the content server 20 may communicate through the Internet using the facilities of the PSTN or cable and other broadband communications mechanisms. The content server 20 is discussed in further detail in reference to FIGS. 2 and 4.

Figure 2:
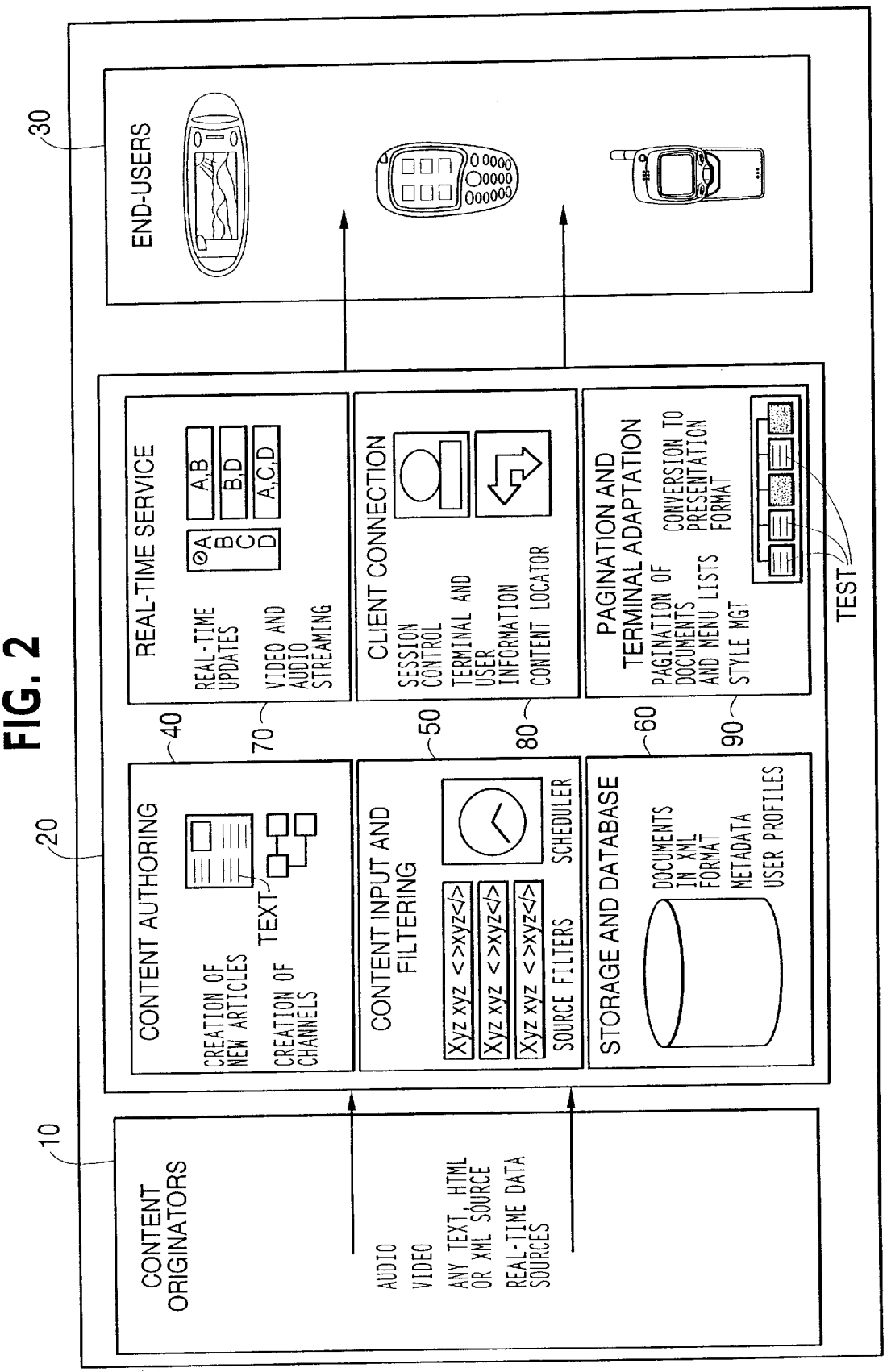
FIG. 2 is an example of the overall system diagram shown in FIG. 1 illustrating further detail of the modules contained in the content server used in an example embodiment of the present invention.
Figure 3:
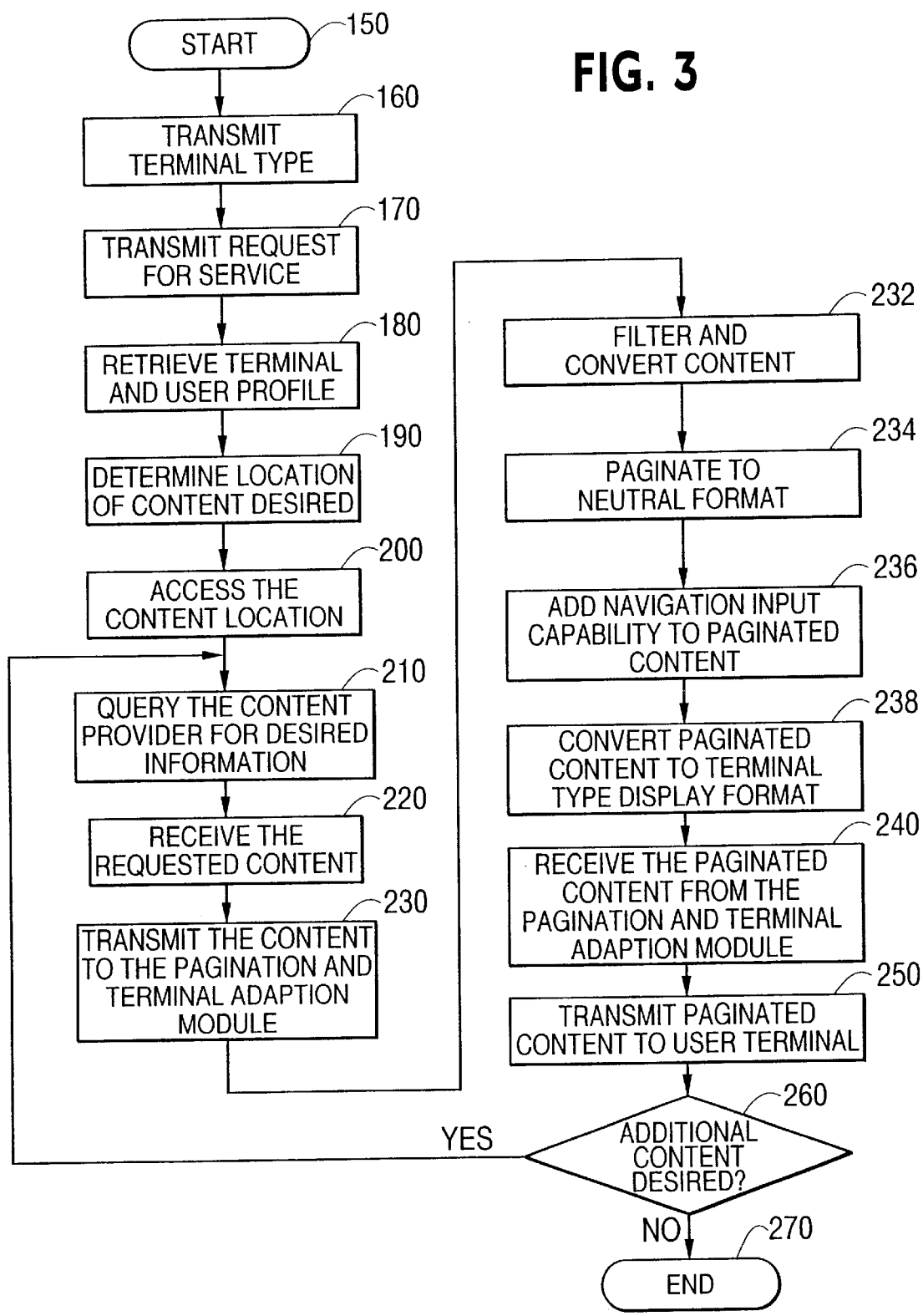
FIG. 3 is an example flowchart of the operations which take place between the content provider, the content server and the user terminal in an embodiment of the present invention shown in FIG. 1 and FIG. 2.
Figure 4:
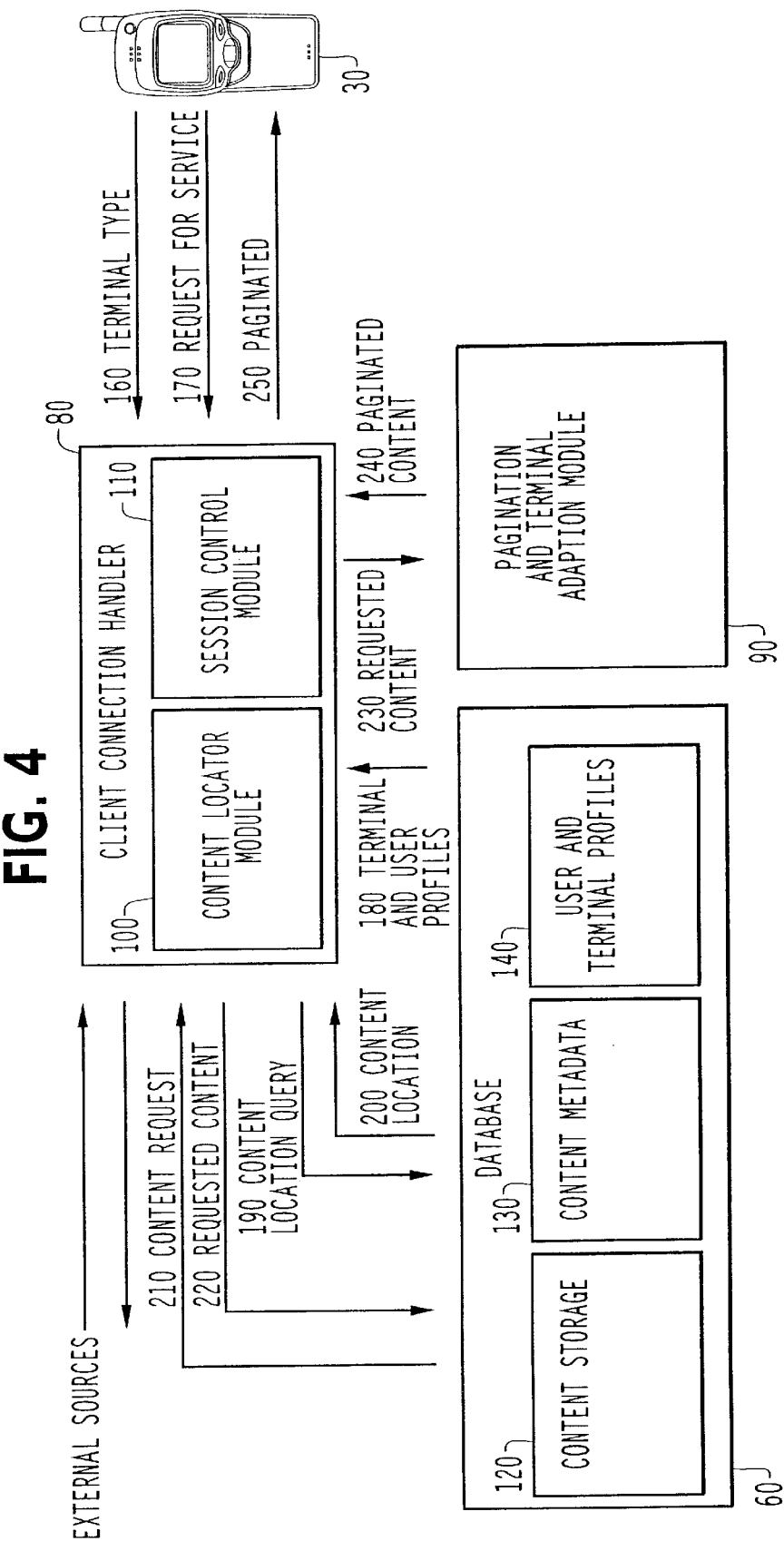
FIG. 4 is an example data flow diagram showing the data flow seen in the operations shown in the FIG. 3 flowchart.
Figure 5:
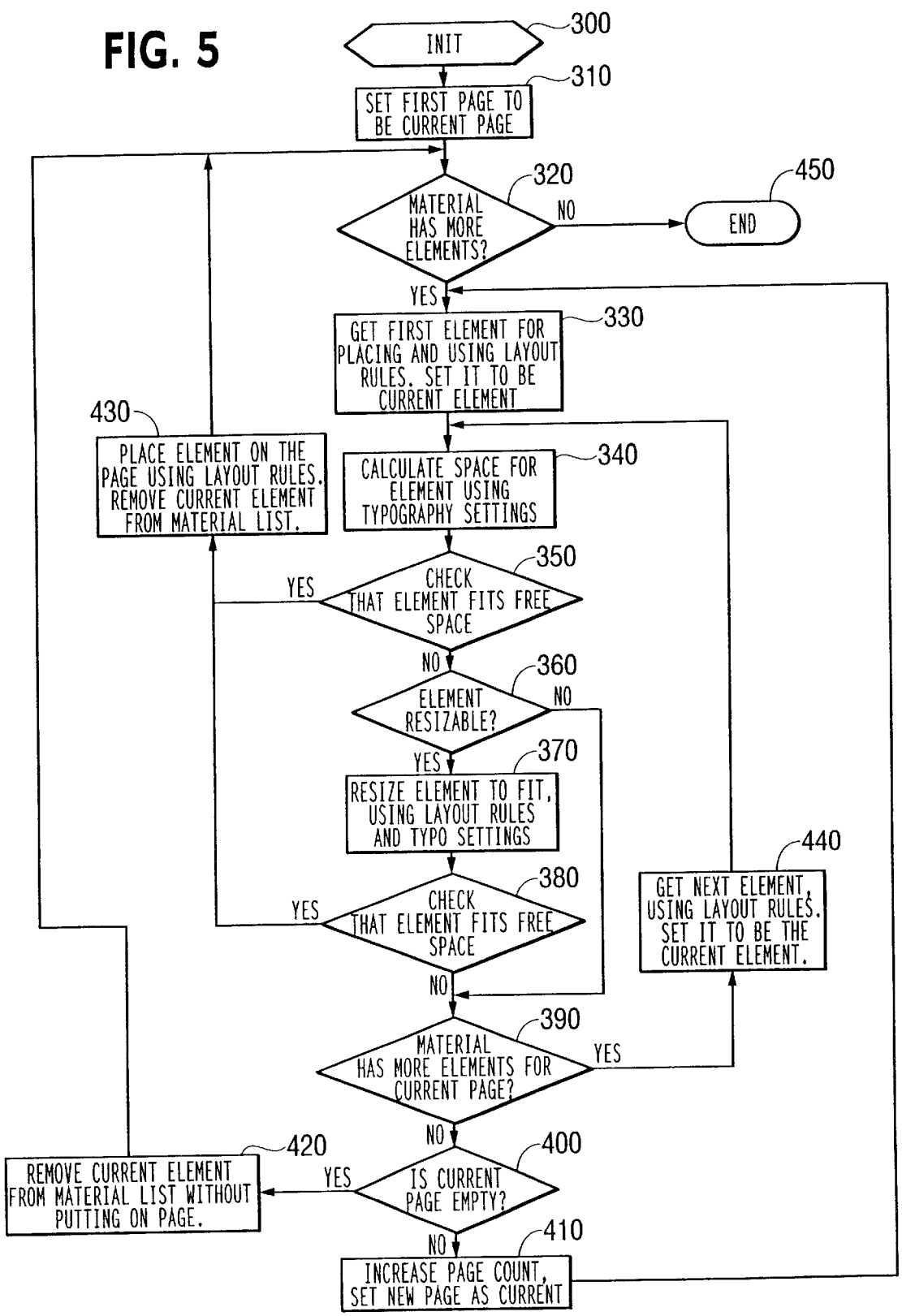
FIG. 5 is an example flowchart illustrating the operations performed by the pagination and terminal adaptation module 90 shown in FIG. 2 and FIG. 4 of an embodiment of the present invention.

The modular configuration diagrams shown in FIG. 2 and data flow diagram shown in FIG. 4 as well as the flowcharts shown in FIGS. 3 and 5 contain software, firmware, hardware, processes or operations that correspond, for example, to code, sections of code, instructions, commands, hardware, objects, or the like, of a computer program that is embodied, for example, on a storage medium such as floppy disk, CD Rom, EP Rom, RAM, hard disk, etc. Further, the computer program can be written in any language such as, but not limited to, for example Java or C++.

FIG. 2 is an example of the overall system diagram shown in FIG. 1 illustrating further detail of the content server 20 used in an example embodiment of the present invention. As indicated in FIG. 1, the content provider or originator(s) 10 and the content server 20 are separate and distinct entities. However, the content provider 10 and content server 20 may be embodied together into a single entity. In either case, the content provider or originator (s) 10 would supply the content which may be any type of digital information. This digital information may include audio, video, text, HTML script, XML script or any other form of digital data. As shown and FIG. 2, this digital data would be transmitted to or accessed by the content server 20. Upon receipt by the content server 20 of this digital data depending upon the nature of the data, it may pass through a content input and filtering module 50 or a content authoring module 40. The content authoring module 40 may determine to divide the digital data into separate channels based upon the nature of the content or it may divide the digital data into separate articles. The content authoring module 40 would be employed when the digital data takes the form of news articles, or radio and television channels. These separate channels are further illustrated and discussed in reference to FIG. 8 and FIG. 9 ahead.

Still referring to FIG. 2, the content input and filtering module 50 is also utilized for receipt and processing of real-time data. This real-time data would include such items as stock quotes in which the rapid display of changing information is critical. In order to keep data traffic to a minimum between the user terminal 30 and content provider 10, source filters are provided that update the user terminal 30 only when a change occurs to information that is currently being displayed on the user terminal 30. Using this mechanism, only when a viewed stock price or other piece of real-time data, changes will it be updated on the user terminal 30. Further, a scheduler may be provided in which regular updates of information are downloaded to the user terminal 30 based on the user profile. Further, the content input and filtering module 50 would translate the data received from the content authoring module 40 or content providers 10 into a computer or markup language, such as, but not limited to, extensible markup language (XML) format for storage in database 60 in the content storage file 120. Also, the content input and filtering module 50 would extract keywords, classifications or the actual location from the data and store these keywords into the content metadata file 130 in database 60.

Still referring to FIG. 2, a storage device and database 60 is provided in the content server 20 in order to store digital data received as well as documents and user profiles and information required to interface to the terminal and screen type being used. The information stored in database 60 related to terminal input and screen type is discussed in further detail in reference to FIGS. 4 through 6 ahead. User profiles may include such data as user preferences or options available based upon the calling or service plan subscribed to by the user. Further, a real-time service module 70 is provided in order to interface to the user terminal 30. This real-time service module 70 would allow for accessing a specific portion of the user terminal 30 screen to allow for updates in such items as stock prices. Further, the real-time service module 70 would also be able to transmit video and audio signals in a streaming mode to the user terminal 30 such as required when listening to music or viewing a video or television program.

Still referring to FIG. 2, the real-time service module 70 is provided to interface to the user terminal 30 and the remainder of the content server 20 software. The real-time server module 70 may send digital data to the user terminal 30 via either real-time updates or video and audio streaming. When video and audio streaming is required, the real-time service module 70 transmits the digital data in a continuous flow to the user terminal 30. However, if real-time updates are required, such as when monitoring stock prices, the real-time data server module 70 communicates with the source filters in the content input and filtering module 50 using remote method invocation (RMI). RMI is a remote procedure call (RPC), which allows Java objects (software components) stored in the network to be run remotely.

Also still referring to FIG. 2, a client connection handler 80 is used to accomplish three functions. First, the client connection handler 80 is used for session control employing a session control module 110, shown in FIG. 4. Session control is accomplished by the session control module 110 of the client connection handler 80 listening to and monitoring the ports in the content server 20 for an incoming connection request from the user terminal 30. When an incoming call is detected from the user terminals 30, the client connection handler 80 launches a dedicated data server thread to serve each connection. Further, the client connection handler 80 will retrieve the specific information related to the user terminal 30 and client from database 60. Also, the client connection handler 80 will locate either within database 60 or the content input and filtering module 50 the location of the content selected by the user by employing a content locator module 100, shown in FIG. 4.

Still referring to FIG. 2, a pagination and terminal adaptation module (pagination engine) 90 is utilized to paginate documents and menu lists sent to user terminal 30. The pagination engine 90 also converts the digital data to the proper format for each user terminal 30 and further supplies a style manager to accomplish this format conversion. The pagination engine 90 will be discussed in further detail in reference to FIG. 4 and FIG. 5 ahead.

FIG. 3 is an example flowchart of the operations which take place between the content provider 10, the content server 20 and the user terminal 30 in an embodiment of the present invention shown in FIG. 1 and FIG. 2. In the discussion of FIG. 3, reference will also be made simultaneously to FIG. 4. FIG. 4 is an example data flow diagram showing the data flow seen in the operations shown in the FIG. 3 flowchart. The appropriate reference numeral for the operations shown in FIG. 3 are repeated in FIG. 4 in order to illustrate the data flow between the software and hardware modules utilized in the content server 20, shown in FIG. 2.

Figure 7:
FIG. 7 is an example screen that may be generated using the embodiments of the present invention.
Figure 8:
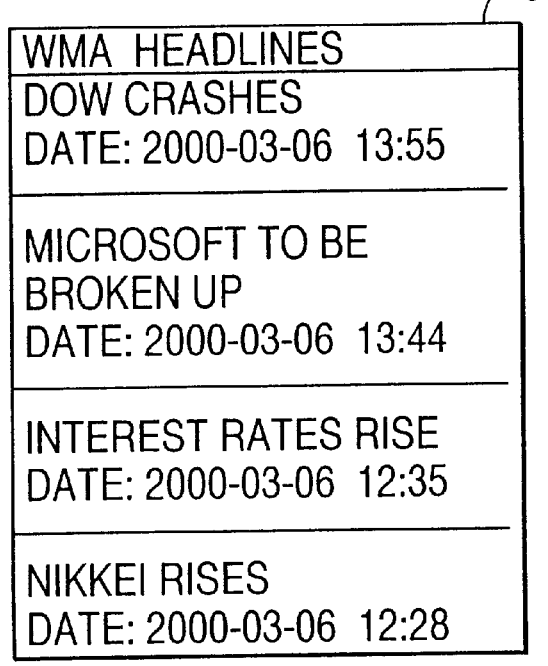
FIG. 8 is another example of a screen that may be generated using the embodiments of the present invention.

Referring to FIG. 3 and FIG. 4, the content server 20 begins execution in operation 150. Thereafter, processing proceeds to operation 160 in which the user terminal 30 transmits its terminal type to client connection handler 80 upon initial logon to the content server 20. This terminal type would allow access to user and terminal profiles, as shown in FIG. 4, as well as the device translator table, shown in FIG. 6. Using the user and terminal profiles 140 and the device translation table, it is possible to format the content to be displayed on any device. As indicated in FIG. 2 and FIG. 4, the client connection handler 80 contains a content locator module 100 and a session control module 110. In operation 170, the user, via user terminal 30, would select a service desired. This service would be selected from a menu list as exemplified by those shown in FIGS. 7 and 8. Thereafter, in operation 180, the client connection handler 80 would access a user and terminal profile 140 contained within database 60. The user and terminal profile 140 would be utilized by the pagination engine 90 to create the menu list, shown in FIGS. 7 and 8. In operation 190, the content locator module 100 would access the content metadata file 130 to determine the location of content requested by the user terminal 30. The content may be located locally in a content storage file 120 or some content provider 10 external to the content server 20. For example, when done locally by directly accessing the content storage file 120 as in the case where a specific item or article is selected from a menu list as shown in FIGS. 7 and 8. In the alternative, where a search term is enter or specified via the user terminal 30, the content locator module 100 would access the content metadata file 130 within database 60 to determine if matches from keywords in an article may be found. Where such matches are found, then the client connection handler 80 may transmit a menu list of those articles to user terminal 30 for the user to select from. In addition to metadata being a keyword it may also be a classification of a type of information or may be a pointer or actual location of the content.

Still referring to FIGS. 3 and 4, once the content location is determined, processing proceeds to operation 200 where the content location is transmitted to the client connection handler 80. In operation 210, the contents received from the content provider 10 are extracted from the content storage file 120 in XML or other suitable computer or markup language format using the content locator module 100. As previously discussed, all content data received from content providers 10 is translated prior to storage in content storage file 120 into XML or other suitable computer or markup language format. Thereafter, processing proceeds to operation 220 in which the extracted XML or other suitable computer or markup language format content is transmitted to the client connection handler 80. In operation 230, the content connection handler 80 transmits the content to the pagination and terminal adaptation module 90.

The pagination and terminal adaptation module 90, discussed in further detail in reference to FIG. 5 ahead, paginates and formats the content based on the terminal type received in operation 160 and the user profile contained in the user and terminal profile 140. By operation 230, the pagination and terminal adaptation module 90 has access to the terminal profile 140 and therefore is aware of the terminal capabilities. These capabilities would include, but not limited to, screen size, bandwidth, color vs. black and white, media types supported by this terminal type (i.e., video/audio, animation, etc.) and input capabilities as will be discussed in further detail in reference to FIG. 6. The pagination and terminal adaptation module 90 then proceeds to operation 232 where the content is filtered and converted. This filtration and conversion process entails determining for each element in the content whether it may be supported by the particular terminal type. If it cannot be supported then it is stripped out of the content. However, whatever element can be converted into a supportable format is converted. For example, if the terminal type cannot support or does not have the capability of presenting a video, then all video elements in the content are filtered out. If, for example, the terminal supports only a black and white screen then a color content it is converted to black and white for display. Also, picture resolution is adjusted for the screen resolution being used and video images may be reduced or down scaled based on the bandwidth capability available. Upon completion of operation 232, all elements all the content are now in a format which is supported by the user terminal 30. In operation 234 this paginated content is further converted to a neutral format. This conversion to a neutral format is done utilizing the typographical and layout rules previously discussed. An example is provided of what the paginated content may look like in table 1 ahead. The example provided in table 1 is provided for illustration purposes only and not intended to limit the scope of the embodiments of the present invention as provided in the claims. In the example provided in table 1 the article has been divided into two pages with one column each. This division of the content was done in order for the text to fit the user terminal 30.

TABLE 1

```
<article>
    <page1>
        <column1>
            <textblock x=1 y=2 height=3 width=20 font=Arial fontsize=15>
                FED announces interest rate hick.
        </textblock>
            <textblock x=1 y=5 height=3 width=20 font=Arial fontsize=10>
                World markets Collapse. (xypublications 20.5.2000)
            </textblock>
            <textblock x=1 y=8 height=15 width=20 font=Times fontsize=10>
            Today on Wall Street as a result of the Federal Reserve
            announcing the seventh interest rate increase in a one year
            period the DOW dropped over 500 points.
            </textblock>
            <picture x=1 y=23 height=15 width=20
            location>pic1.jpg</picture>
        </column1>
    </page1>
    <page2>
        <column1>
            <textblock x=1 y=2 height=15 width=20 font=Times
            fontsize=10>
            The Nasdaq followed the DOW index and dropped 300 points.
            </textblock>
        </column1>
    </page2>
</article>
```

Once the content has been paginated to a neutral format processing proceeds to operation 236. In operation 236, the navigation capability associated with the terminal type for this user terminal 30 is implemented using either links in the output language format or by using scripts in the case where the user terminal 30 does not support the selection of links. Processing then proceeds to operation 238 where the paginated content is converted to the terminal type display format. This display format would be the specific script or language being used by the user terminal 30 and may be, but not limited to, HTML, XML, or any other suitable language.

Once the content is paginated and formatted, the content is transmitted, in operation 240, to the session control module 110 in the client connection handler 80. Thereafter, in operation 250, the session control module 110 of the client connection handler 80 transmits the paginated contents to the user terminal 30. In operation 260, the session control module 110 in the client connection handler 80 determines if further content is desired. If it is determined, in operation 260, that further content is desired, then processing branches back to operation 210. However, if further processing is not desired, then processing proceeds to operation 270 where the session for this particular user terminal 30 is terminated.

FIG. 5 is an example flowchart illustrating the operations performed by the pagination and terminal adaptation module 90 shown in FIG. 2 and FIG. 4 of an embodiment of the present invention. The pagination engine 90 begins processing in operation 300 upon initialization. Thereafter, in operation 310, the first page of the content to be paginated is set to the current page. In operation 320, it is determined whether the material or content has additional elements that need to be paginated. These elements may include a portion of a screen and may include, but not limited to, text, graphics, images, video, audio, embedded viewers, animation, and any other type of information presentation permitted on a processor based system. Further, these elements may be any other type of information including, but not limited to, images, video, audio, embedded viewers or any other type of presentation mechanism permitted by a processor. If it is determined, in operation 320, that no further elements need be paginated, then processing proceeds to operation 450 where the pagination and terminal adaptation module e 90 terminates execution. However, if additional elements of the content need pagination, then processing proceeds to operation 330. In operation 330, the specific element of the content or the material is retrieved from the content storage file 120 and the placement and usage layout rules for this terminal type and user profile are retrieved from the user and terminal profile 140 contained in database 60. Layout rules provide information, such as but not limited to, the number of columns to use, positioning of the caption (i.e., below the picture or above the picture, etc.), and space between paragraphs.

Still referring to FIG. 5, in operation 340 the space required by the specific element is calculated based on the typographical settings for this terminal type. Typographical settings or rules indicate, but are not limited to, such items as font type, fonts sizes, color, etc. for each element. Further, the screen capability for this terminal type is also determined and the element is altered to match the user terminal 30. For example, if the screen for the user terminal 30 has only black and white capability, then the element for the content is altered to only be displayed in black and white. Thereafter, in operation 350, the pagination and terminal adaptation module 90 checks to see whether there is sufficient space to display the element on the user terminal 30. If it is determined, in operation 350, that sufficient space exists for the element to fit on the screen of the user terminal 30, then processing proceeds to operation 430 where the element is placed on the page using layout rules retrieved from the user and terminal profile 140. Thereafter, processing loops back to operation 320 to determine if additional elements of the content or material need to be processed.

However, if it is determined, in operation 350, that the element does not fit into the designated space on the user terminal 30, then processing proceeds to operation 360. In operation 360, it is determined whether the element is resizable. In operation 360, if it is determined the element is resizable, then processing proceeds operation 370, otherwise processing proceeds to operation 390. In operation 370, the element is resized using the layout rules and typographical settings retrieved from the user and terminal profile 140. In the case of text, such resizing may entail splitting or dividing the text block into multiple blocks so that as much of the element that can fit on the current page and moving the remainder onto successive pages until all the text is displayed. However, in the case of graphics more sophisticated algorithms may be used. Thereafter, in operation 380, the element is checked to determine whether it fits in the space allocated in the user terminal 30. If it is determined, in operation 380, that the element does fit within the space allocated then processing proceeds back to operation 430, as previously discussed. In this manner the content is modified and adjusted to meet the requirements and limitations of the user terminal 30. However, if it is determined, in operation 380, that the element does not fit within the space allocated, then processing proceeds to operation 390 where it is determined if content has additional elements for the current page. If, in operation 390, it is determined that the content has more elements for the current page, then processing proceeds to operation 440. In operation 440, the next element of the content is retrieved using layout rules and set as the current element for processing. Thereafter, processing loops back to operation 340, where processing in the pagination and terminal adaptation module 90 continues.

However, if, in operation 390, it is determined the current content page does not have any further elements, then processing proceeds to operation 400. In operation 400, a determination is made whether the current page is empty and thus all elements have been processed. If operation 400 determines that the current page is empty, then processing proceeds to operation 420. In operation 420, the current element being examined is removed from the material list without being placed on the page to be transmitted to user terminal 30. Thereafter, processing loops back to operation 320. However, if it is determined that the current page is not empty then processing proceeds to operation 410. In operation 410, the page count is incremented and the next page is set as the current page.

FIG. 6 is an example table illustrating the functions 560 enabled for any given device type 550 which the embodiments of the present invention may interface with. The table shown in FIG. 6 is provided solely as an example of how embodiments of the present invention as discussed previously would translate the functions 560 of one device type 550 for an another. Device types 550 are illustrated using device type examples 500, 510, 520, 530 and 540. Device type example 500 illustrates the general types of functions 560 required by the user terminal 30 to access the present invention. Device type example 510 illustrates how these general types of functions 560 shown for device type example 500 map into a PC with a browser environment and keyboard navigation. As indicated in device type example 510, a previous level may be reach by pressing the left arrow key. Further, device type example 510 a certain may be conducted by pressing key F3. In addition, a previous page may be accessed by pressing the up arrow key. The same holds true for the device types 520, 530 and 540.

FIG. 7 and FIG. 8 are example screens that may be generated using the embodiments of the present invention. FIG. 7 is an example menu list for the wireless media application (WMA) which may be generated by the embodiments the present invention. A user terminal 30 with a small screen, such as a WAP capable telephone may contain a list of channel and categories as shown in FIG. 7. Using the arrow keys on such a WAP capable telephone, the user may highlight one of the selected items for viewing. FIG. 8 is an example in which the user has selected the headlines category shown in FIG. 7. Thereafter, a user may further select one of the articles shown in FIG. 8 for reading.

FIG. 9 is an example of web pages generated using the embodiments of the present invention. The example illustrated in FIG. 9 shows 3 of 8 pages being displayed on a device having small screen. This type of display may be selected based on items listed as shown in FIG. 8 or as a result of a search using keywords stored in the content metadata file 130. In either case, the amount of text and graphics displayed is based on the type of user terminal 30 employed.

Using the foregoing embodiments of the present invention, a user is able to access Internet based web pages and view them on devices ranging from a WAP capable telephone to a personal computer. This is possible since elements within a given page to be transmitted are individually analyzed to determine if they fit the designated area in the screen. Where possible, the text or graphic is reduced in size to fit the screen. Where it is not possible to reduce the text or graphic size then that element is divided and shown or presented on the next page. Further, whatever the type of device that is being used to access the Internet, the full functionality would be identified and used by the embodiments of the present invention.

Therefore, the benefits of such a system are that many different types of terminals with different capabilities for different media types, input devices, as well as, screen sizes and display formats may be supported. These display formats include HTML as well as XML among others. Further, using a paginated content it is possible to keep the user interface extremely simple and screens may be fitted onto pages so that no scrolling is required, thereby making the text easier to read. Also, using the embodiments of the present invention screen space is more efficiently used making possible the availability off Internet Web sites using portable devices.

While we have shown and described only a few examples herein, it is understood that numerous changes and modifications as known to those skilled in the art could be made to the present invention. For example, any type of data may be retrieved and transmitted to users on a selective basis. Also, the content provider 10 and the content server 20 may be the same physical entity. Therefore, we do not wish to be limited to the details shown and described herein, but intend to cover all such changes modifications as are encompassed by the scope of the appended claims.

We claim:

1. A method of information pagination in order to display the information on a user terminal screen, comprising:

identifying a user terminal type and screen size upon logon of a user terminal;

extracting layout rules and typographical settings from a database based on the user terminal type;

calculating the space required to display an element of a plurality of elements of a page of information on the user terminal screen;

determining if the space required to display the element is available on the user terminal screen;

resizing the element when the determination is made that there is not adequate space on the user terminal screen to display the element; and displaying the element according to the layout rules and typographical settings on the user terminal screen.

2. The method recited in claim 1, wherein the element is either text, graphics, images, video, audio, embedded viewers, animation, and any other type of information presentation permitted on a processor based system.

3. The method in recited claim 1, wherein the resizing of the element further comprises:

splitting the element in to individual blocks so that as much of the element that can fit into a single screen based on terminal type is accomplished and any remaining element is moved on to successive screens.

4. The method recited in claim 2, further comprising:

skipping the element when it is determined that the space required to display the element is not available on the user terminal and that the element cannot be resized to fit the space available on the user terminal screen, thereby the page of information is altered to match the screen.

5. The method recited in claim 2, further comprising:

skipping the element when the user terminal due to color, size, video, resolution or other limitations of the user terminal prevents display or presentation of the element.

6. The method recited in claim 4, further comprising:

adjusting the element video and audio based on the terminal type so that the element may be displayed on the user terminal screen.

7. The method recited in claim 4, further comprising:

accessing a device translation table based on the terminal type in order to determine input capability of the user terminal.

8. The method recited in claim 4, further comprising:

transmitting the element of a plurality of elements to the user terminal in a continuous stream.

9. The method recited in claim 4, further comprising:

transmitting the element of a plurality of elements to the user terminal for display in a specified location on the user terminal screen when the value represented by the element changes.

10. The method recited in claim 4, further comprising:

selecting the page of information to be displayed on the user terminal screen from a menu list.

11. The method recited in claim 4, further comprising:

searching a file of keywords for a keyword that matches a search term entered in the user terminal;

displaying a menu list of articles associated with the keywords that match the search term entered;

selecting the page of information to be displayed on the user terminal screen from the menu list.

12. A system of information pagination in order to display information on a user terminal screen, comprising:

a database to store information to display on the user terminal screen and to store a terminal profile for a plurality of user terminals;

a client connection handler to communicate to a user terminal and retrieve information from the database and transmit the information to user terminal for display on the user terminal screen; and a pagination engine to determine, based on the terminal profile, if each element of a plurality of elements contained in the information retrieved from the database will fit in available space on the user terminal screen and to resize the element so that the element will fit into the space available on the user terminal screen when it is determined that the element will not fit in the space available on the user terminal screen.

13. The system recited in claim 12, wherein the database further comprises:

a content storage file to store the information to be displayed on the user terminal screen;

a content metadata file to store keywords extracted from the information stored in the content storage file; and a user and terminal profile to store a plurality of user terminal characteristics for a plurality of user terminals and a plurality of user specifications associated with each user.

14. The system recited in claim 12, wherein the client connection handier further comprises:

a session control module to communicate to the user terminal and the pagination; and a content locator module to search the metadata file for search terms transmitted by the user terminal and retrieve information from the content storage file.

15. The system recited in claim 12, wherein the information stored in the content storage file is in XML, HTML or other suitable format.

16. The system recited in claim 12, wherein the pagination engine will skip elements that cannot be resized and not include then in transmissions to the user terminal when it is determined that the element will not fit on the available space of the user terminal screen base in the terminal profile.

17. The system recited in claim 16, further comprising:

a user and terminal profile, accessible by the pagination engine based on terminal type, and having layout, typographical settings, and a device translation table.

18. The system recited in claim 17, wherein the device translation table comprises general function types indicative of keyboard navigation inputs and associated specific keyboard navigation inputs for each terminal type, wherein the navigation table is accessed by the pagination engine to determine to keyboard navigation inputs that may be used by the particular user terminal.

19. The system recited in claim 17, wherein the information displayed to the user is adjusted to fit the user terminal screen and adjusted according to color and video capabilities of the user terminal screen.

20. The system recited in claim 12, wherein the user terminal will specify the information desired by a user via a selection of an item in a menu list or the entry of the search term by the user.

21. A computer program executable by computer and embodied on a computer readable medium for information pagination in order to display information on a user terminal screen, comprising:

a database to store information to display on the user terminal screen and to store a terminal profile for a plurality of user terminals;

a client connection handler code segment to communicate to a user terminal and retrieve information from the database and transmit the information to user terminal for display on the user terminal screen; and a pagination engine code segment to determine, based on the terminal profile, if each element of a plurality of elements contained in the information retrieved from the database will fit in available space on the user terminal screen and to resize the element so that the element will fit into the space available on the user terminal screen when it is determined that the element will not fit in the space available on the user terminal screen.

22. The computer program recited in claim 21, wherein the database further comprises:

a content storage file to store the information to be displayed on the user terminal screen;

a content metadata file to store keywords extracted from the information stored in the content storage file, a classification of information stored in the content storage file, or a location where the information may be found; and a user and terminal profile to store a plurality of user terminal characteristics for a plurality of user terminals and a plurality of user specifications associated with each user.

23. The computer program recited in claim 22, wherein the client connection handier further comprises:

a session control module code segment to communicate to the user terminal and the pagination; and a content locator module code segment to search the metadata file for search terms transmitted by the user terminal and retrieve information from the content storage file.

24. The computer program recited and claim 23, wherein the information stored in the content storage file is in XML, HTML or other suitable format.

25. The computer program recited and claim 24, wherein the pagination engine code segment will skip elements that cannot be resized and not include then in transmissions to the user terminal when it is determined that the element will not fit on the available space of the user terminal screen base in the terminal profile.

26. The computer program recited and claim 23, wherein the user terminal will specify the information desired by a user via a selection of an item in a menu list or the entry of the search term by the user.

27. The computer program recited in claim 25, further comprising:

a user and terminal profile, accessible by the pagination engine based on terminal type, and having layout, typographical settings, and a device translation table.

28. The computer program recited in claim 27, wherein the device translation table comprises general function types indicative of keyboard navigation inputs and associated specific keyboard navigation inputs for each terminal type, wherein the navigation table is accessed by the pagination engine to determine to keyboard navigation inputs that may be used by the particular user terminal.

29. The computer program recited in claim 28, wherein the information displayed to the user is adjusted to fit the user terminal screen and adjusted according to color and video capabilities of the user terminal screen.

* * * * *